J. R. SMITH.
FLY TRAP.
APPLICATION FILED APR. 23, 1912.
1,057,291.
Patented Mar. 25, 1913.
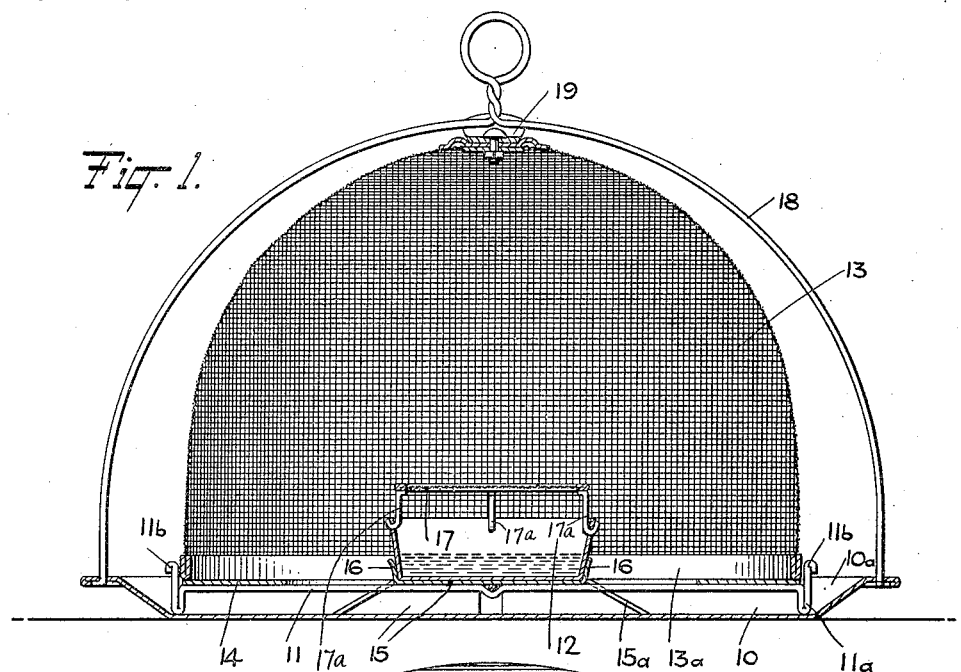
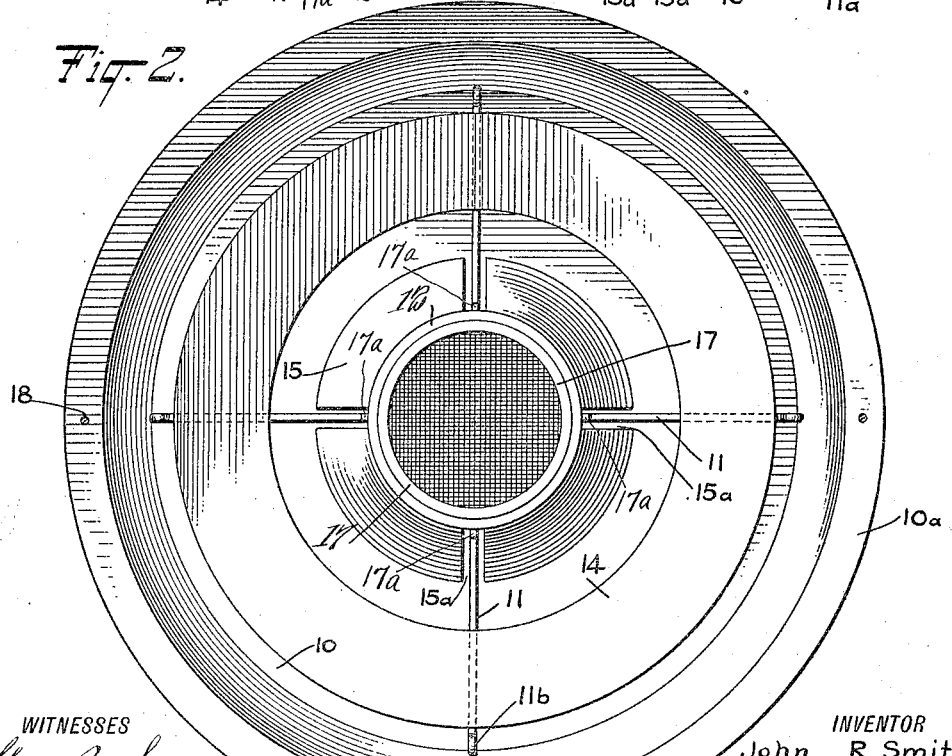
WITNESSES
George Bambay
Geo. L. Beeler
INVENTOR
John R. Smith
BY
ATTORNEYS

UNITED STATES PATENT OFFICE.

JOHN RANDOLPH SMITH, OF STELLA, MISSOURI.

FLY-TRAP.

1,057,291.　　　　Specification of Letters Patent.　　Patented Mar. 25, 1913.

Application filed April 23, 1912. Serial No. 692,593.

*To all whom it may concern:*

Be it known that I, JOHN R. SMITH, a citizen of the United States, and a resident of Stella, in the county of Newton and State of Missouri, have invented a new and Improved Fly-Trap, of which the following is a full, clear, and exact description.

This invention relates to devices for trapping or catching flies or other insects, and has particular reference to devices of this character in which the insects will not only be imprisoned but will be poisoned while therein so that it will not be necessary for a person to collect them subsequently and whereby insects upon dying from the effects of poison will be prevented from dropping and collecting in places causing them to become unsanitary. This device, therefore, combines in one structure the means for not only catching, but collecting the insects, hereinafter referred to as flies.

The aforegoing and other objects of the invention are obtained by means of the mechanism hereinafter fully described and claimed, and illustrated in the accompanying drawings, in which—

Figure 1 is a vertical section of a preferred embodiment of the invention; Fig. 2 is a plan view of the same, the bail being in section and the dome removed.

In carrying this invention into practice I have shown at 10 a tray of any suitable outline and having a slightly elevated rim 10ª. Upon the upper surface of the tray is arranged a spider or support 11, shown as comprising a plurality of cross wires or rods connected at their center and terminating in downward projections 11ª and whose extreme outer ends are extended thence upwardly forming fingers 11ᵇ.

At 12 is indicated a suitable form of poison cup adapted to be supported upon the spider 11. In this cup will be placed any bait suitable to attract the flies and which will be saturated with some suitable liquid poison, such, for instance, as Fowler's solution of arsenic, fluid extract of belladonna, or the like. The cup 12 will be substantially hollow and open at the top that the flies may have access to the bait, and after partaking thereof they will try to escape by flying outward or upward, but will be checked by coming into contact with the inner surface of the dome 13 made of any suitable reticulated material and of any preferred form. The lower edge 13ª of the dome will rest within the aforesaid fingers 11ᵇ and preferably upon an annulus 14 resting upon the spider 11 and extending inwardly from the dome edge 13ª toward the poison cup 12, but spaced therefrom so that the flies may enter the trap by passing beneath the lower edge of the dome and said annulus, coming up between the same and the cup. The purpose of the annulus is to practically render it impossible for the flies to escape downwardly from the dome after once being admitted thereinto. By long and careful observation of the habits of flies I have noticed that they may pass downwardly, as into the poison cup, sufficiently far to eat of the bait so long as they are not aware that they are imprisoned, but after trying to escape they practically never seek to escape through the opening when it is necessary for them to fly or creep downward along or around any object. The flies, therefore, after having eaten the poisoned bait, cannot or will not by any possibility escape from the dome 13, and thence will be collected in the bottom of the tray, preventing any possibility of their being scattered promiscuously about the house in an unsanitary manner.

Any suitable means may be employed to retain the poison cup 12 in the position indicated. For this purpose, however, I have devised and shown a retainer 15 stamped and formed preferably out of sheet metal, the lower edge of which rests upon or adjacent the upper surface of the tray, but provided with as many slits 15ª as there are arms of the spider 11 into which said arms are received. By use of this construction the retainer is positively held from displacement laterally by said arms. The portions of the sheet metal which are cut to form the slits 15ª are bent upwardly, as indicated at 16, forming fingers which embrace the poison cup 12 holding it in place.

At 17 is shown any suitable form of a cover supported in spaced relation upon the upper edge of the poison cup by means of legs 17ª and adapted to prevent flies from falling into said cup and interfering with the proper operation of the device.

The dome and the other parts beneath or within the same may be conveniently secured to the tray by means of a bail 18 pivoted to the flange 10ª and having a spring snap connection as at 19 with the top of the dome. By forcing the bail laterally it may be withdrawn from the catch 19 and the dome then lifted from the other parts in order to cleanse the trap or to recharge the same with bait.

The several parts of the device may be made of any suitable materials, and the relative sizes and proportions of the same may be varied to a considerable extent without departing from the spirit of the invention. It is to be noted, furthermore, that all of the parts practically are of such a form that they may be nested in large numbers for packing and shipping; that is to say, the several parts may be multiplied in large numbers and nested each to each so that a gross of sets of parts might be packed in a comparatively small space, a matter of considerable importance commercially. Again, by the term "spider," used herein, I wish to be understood as covering any means functionally equivalent to the device illustrated.

Having thus described my invention, what I claim as new and desire to secure by Letters Patent is:—

1. In a fly trap, the combination of a tray, a spider within and spaced from the tray and having upwardly extending fingers, said spider comprising a series of arms, an annulus resting upon said spider arms within said fingers, a dome resting upon said annulus, and a poison cup secured within the dome and upon said spider.

2. In a fly trap, the combination of a tray, a spider including a series of arms resting upon said tray, a dome resting upon said spider, a poison cup within the dome, and a retainer for said cup comprising a member slitted to embrace said spider arms, the material from the slits being bent upwardly to embrace said cup.

3. In a fly trap, the combination of a tray, a supporting spider thereon, a dome supported by the spider and thereby spaced from the tray, a poison cup within the dome, means coöperating with the spider and the cup to hold the latter in position relatively to the spider, a cover for the poison cup slightly spaced from its upper edge, and means detachably locking the dome and spider to the tray.

In testimony whereof I have signed my name to this specification in the presence of two subscribing witnesses.

JOHN RANDOLPH SMITH.

Witnesses:
J. C. G. LENTZ,
E. K. THORNBURY.

---

Copies of this patent may be obtained for five cents each, by addressing the "Commissioner of Patents, Washington, D. C."